DECODERS

Filed Nov. 18, 1959

United States Patent Office 3,100,257
Patented Aug. 6, 1963

3,100,257
DECODERS

Marcel E. Mussard, Geneva, Switzerland, assignor to Raytheon Company, Lexington, Mass., a corporation of Delaware Filed Nov. 18, 1959, Ser. No. 853,821
7 Claims. (Cl. 235—154)

Figure 1:
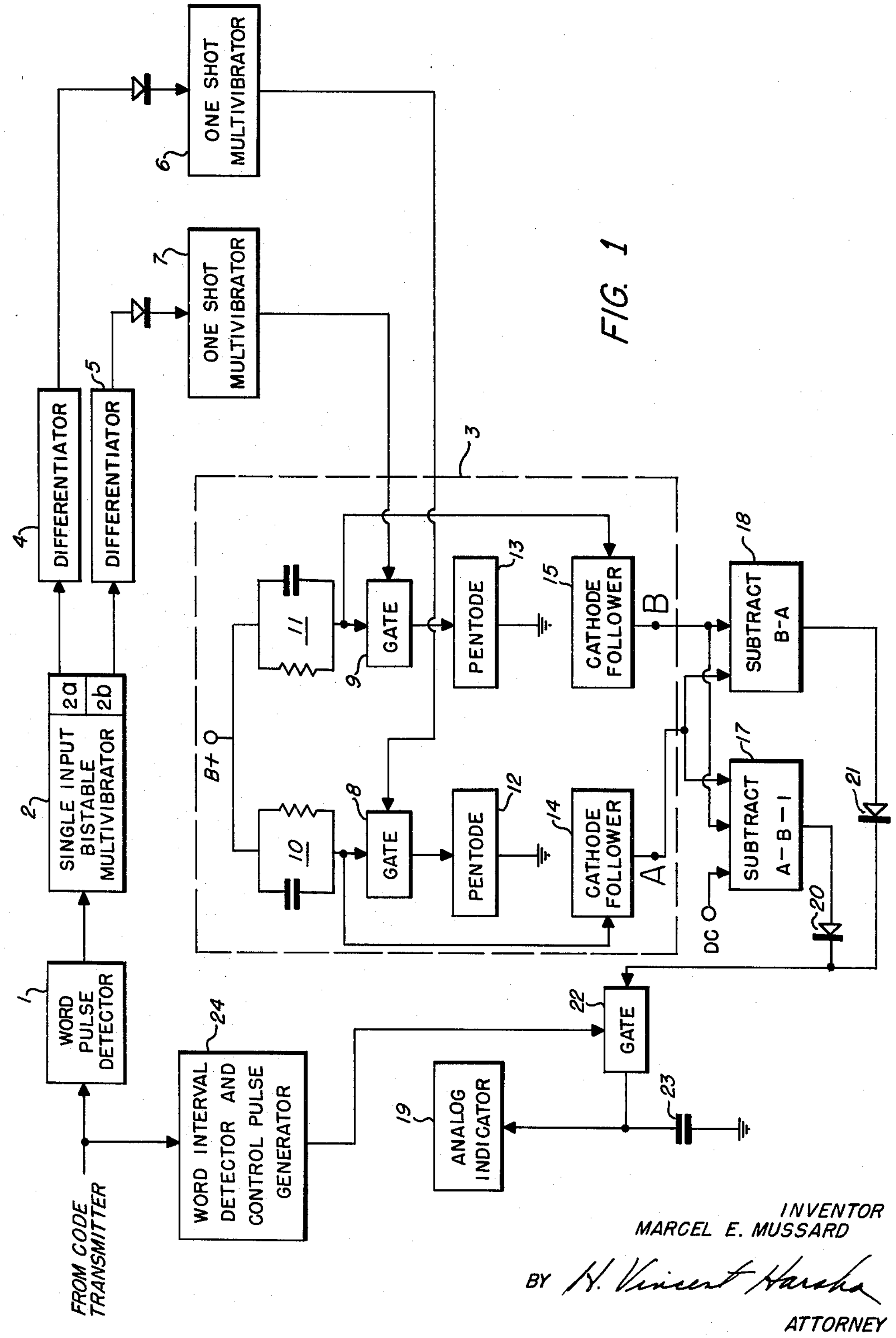

This invention relates to decoders for converting binary information to analog and, more particularly, to such a system for converting a cyclically permutated digital word into an analog signal.

The cyclically permutated digital word effectively consists of two interlaced words; one group of alternate bits representing one word which we may call positive, and another group of alternate bits representing another word which we may call negative. These positive and negative words may be extracted readily and then one subtracted from the other to yield the information in the original cyclically permutated word. In the past, the positive and negative words forming the cyclically permutated word have been extracted by elaborate means employing delay lines. The use of delay lines often results in deterioration of pulses representing the bits and the subsequent loss of a pulse and error. It is the principal object of this invention to provide a system for decoding a cyclically permutated digital word and particularly a system wherein no such delay lines are required and wherein losses characteristic of delay lines will not occur.

One useful method for converting a regular serial binary word into an analog signal is described in considerable detail on page 36, vol. XXVII, January 1948, issue of the Bell System Technical Journal. The method described therein consists of an RC circuit which is charged by the pulses forming the serial binary word. The time constant of the RC circuit is preset so that during any single binary interval, whatever charge is on the capacitor decays precisely 50 percent in amplitude. It, therefore, follows that the charge remaining at some predetermined instant after the arrival of all pulses forming the word will be proportional to the binary number represented by the pulses. As is shown in the reference, the predetermined instant is preferably coincident with the last binary place in the word. A sampling of the voltage on the RC circuit at this instant yields an analog signal representative of the binary value of the word. It is another object of this invention to employ a plurality of means such as shown in the above reference in a system for decoding a cyclically permutated digital word in serial form, least significant bit first, to yield an analog signal representative of said cyclically permutated word.

It is another object of this invention to provide means for separating the binary words representing the positive and negative numbers encoded in a cyclically permutated digital word and to provide means responsive to said separated binary words for computing the number encoded.

It is a feature of this invention to provide means for detecting pulses representing a cyclically permutated word, in serial form, least significant bit first, with separating means coupled thereto for separating alternate pulses forming first and second binary words each composed of different alternate pulses and to apply the pulses forming each of said words to different capacitance devices each having a predetermined time constant and to compare the charge on said capacitance devices in a plurality of comparing devices one of which yields the difference between said first word and said second word and another which yields the difference between said second word and first word minus unity and then to compare said yields and select the positive one as an analog representation of the cyclically permutated word at a given instant, preferably coincident with the last place of the cyclically permutated word.

It is another feature of this invention to employ a device for detecting the interval of the cyclically permutated word producing a gating signal in coincidence with the above mentioned given instant of time for controlling gating means coupling the selected yield to an indicating device.

It is another feature of this invention to employ a simple diode circuit for selecting a positive yield from one of said comparing devices.

Other and further features and objects of this invention will be more apparent from the following specific description taken in conjunction with the drawings in which:

FIG. 1 depicts a block diagram of a system for decoding a cyclically permutated digital word to yield an analog representation thereof.

A cyclically permutated digital word, for example the word X, composed of $n$ bits is described mathematically as follows:

$$X=a(2^{n-1})+(-1)^{a}b(2^{n-1}-1)+(-1)^{a+b}c(2^{n-2}-1)+\ldots \quad (1)$$

In Equation 1, $a$, $b$, $c$, etc., are the individual bits in order of their relative significance. These bits are either one or zero, in digital notation, depending upon the presence or absence of pulses. The mathematical sign or polarity represented by each bit is determined by the factor $(-1)^q$ where $q$ is the number of preceding terms which are not zero. Consequently, the successive bits in the word X represented by pulses, alternately have positive and negative mathematical signs associated therewith because the factor $(-1)^q$ becomes alternately $+1$ and $-1$ and since the most significant bit always represents a positive value, X is always positive.

If all odd pulses represent positive values whose summation is A and all even pulses represent negative values whose summation is B, beginning with the least significant bit, it is apparent that the analog value of the word X may be obtained by subtracting the absolute analog value of B from the absolute analog value of A. However, there is no way of knowing which group of alternate pulses, the odd or even ones, represents positive values and which group represents negative values when the pulses are received in serial form least significant bit first. Consequently, the sign of the analog value of A and the sign of the analog value of B are not known. Now if it is assumed that the first pulse (least significant bit) of the word X always belongs to the A group and there are the same number of pulses forming the word A as there are forming the word B then the most significant bit of the word X falls in group B, and Equation 2 represents the analog value of X.

$$B-A=X \quad (2)$$

However, in the alternate case where A is composed of one more pulse than B, the most significant bit falls in group A, and it is apparent that A must represent the positive value and B must represent the negative value, and, therefore, X is represented as follows:

$$(A-B)-1=X \quad (3)$$

Unity must be subtracted in the left side of Equation 3 because the mathematical significance of each bit of a cyclically permutated word is an integer power of 2 minus one i.e. $(2^{n-2}-1)$, where $n$ is an integer. Consequently, when there are the same number of pulses forming A as there are forming B (as when Equation 2 applies) the subtraction of unity from a binary value to yield the mathematical representation of a bit cancels and X is merely equal to $B-A$. On the other hand, when group A contains one more pulse than group B (as when Equation 3 applies), unity must be subtracted from $A-B$ to yield X.

If means are provided for computing X in the manner expressed by Equation 2 and means are also provided for computing X in the manner expressed by Equation 3, then whichever equation yields a positive value of X will be the proper one, and a signal representative thereof can be employed to energize a display. The following is a description of one embodiment of a system for separating the pulses representative of A and the pulses representative of B from the cyclically permutated digital word X, converting the digital words A and B to analog values of equivalent magnitude, performing operations expressed in Equations 2 and 3, comparing the results and selecting and indicating whichever value of X is positive.

Turning to FIG. 1 there is shown a pulse detector 1 responsive to serial pulses representing a cyclically permutated digital word. The output of pulse detector 1 is applied to a single input bistable multivibrator 2 having output stages **2*a* and 2*b*. Stages 2*a* and 2*b* produce output signals when different groups of alternate pulses are applied to multivibrator 2. The output from each stage is next formed into pulses of precise intervals, which are employed to control gate circuits in digital-analog converter 3. One method for forming these pulses of precise interval is to differentiate an output from multivibrator 2 and feed the spike pulses resulting therefrom to a suitable one shot multivibrator via a diode. The one shot multivibrator produces precise interval pulses when triggered. For this purpose, differentiator circuits 4 and 5 are provided responsive to the outputs from stages 2*a* and 2*b*, respectively. The output from each differentiator circuit is applied via a diode to separate one shot multivibrators such as 6 and 7, and these multivibrators control gates 8 and 9, respectively, in digital-analog converter 3**.

Converter 3 serves to convert the serial digital words represented by the outputs from multivibrators 6 and 7 to equivalent analog voltages. This converter preferably operates essentially as described in the reference above. However, any suitable digital to analog converter for converting a serial binary word into an analog voltage may be employed for converting the outputs from multivibrators 6 and 7 without deviating from the spirit or scope of this invention.

By virtue of the alternate action of bistable multivibrator 2, the odd alternate pulses representative of part of the detected cyclically permutated binary word are separated and reshaped into equivalent pulses of precise interval, while at the same time the even alternate pulses forming part of the same cyclically permutated word are formed into precise interval pulses in the same manner.

Gates 8 and 9 couple identical RC circuits to suitable constant current devices such as pentodes or transistors. As shown in the FIGURE, RC circuit 10 couples B+ to the plate of pentode 12 via gate 8, and RC circuit 11 couples B+ to the plate of pentode 13 via gate 9. The voltages stored by RC circuits 10 and 11 are applied to the input of cathode followers 14 and 15, respectively, and the outputs of these cathode followers, denoted A and B, are applied to comparing circuits 17 and 18, respectively.

Comparing circuit 18 serves to subtract the voltage output A from B, while comparing circuit 17 serves to subtract the voltage output B from A and also subtracts unity from the remainder. Consequently, circuit 18 computes the value X as represented by Equation 2, and circuit 17 computes the value X is represented by Equation 3. The problem then remains to select an output from circuit 17 or 18, whichever is positive, and display this output by indicator 19. One method for doing this is to couple the outputs of circuits 17 and 18 via diodes and a gate circuit to a high Q capacitance and to apply the voltage on the capacitance to indicator 19. Consequently, a positive output will energize indicator 19. For this purpose, diodes 20 and 21 coupling circuits 17 and 18 to the input of gate circuit 22 are provided. The output from gate 22 charges capacitance 23, and the voltage on capacitance 23 is indicated by analog indicator 19.

Gate circuit 22 is controlled by a short duration control pulse from word interval detector 24 which generates control pulses in coincidence with the last digital place of the cyclically permutated word detected by detector 1. When energized by this control pulse, gate 22 opens and capacitance 23 is charged by the output of circuit 17 or 18 (whichever is positive). The duration of this control pulse signal is considerably less than the digital intervals forming the cyclically permutated serial word.

Detector and generator 24 might, for example, include an electronic clock synchronized with the source which generates the cyclically permutated digital words. On the other hand, that source might form coded pulses, whereby each bit forming the cyclically permutated word is coded in one manner, and the word is immediately followed by a differently coded pulse in coincidence with the last place of the word called the word interval pulse. Consequently, the word interval pulse could be separated from the word bit pulses even though all were received on the same channel.

For example, assume that each of the pulses representing a bit of the cyclically permutated word is received by pulse detector 1 as a pair of pulses separated by an interval considerably less than the digital bit interval and that each pair must be decoded to yield the single pulse it represents. Furthermore, assume that the word interval pulse from the transmitter is also represented by a pair of pulses separated by a different interval which is also considerably less than the bit interval of the cyclically permutated word. In such a system, pulse detector 1 and detector generator 24 might each consist of simple circuits for detecting pairs of pulses where the pulses of a pair are separated by predetermined intervals which are different.

While there is described above one embodiment of the invention incorporating a given system for converting a serial binary word into an equivalent analog signal to thereby decode a cyclically permutated digital number with a given circuit for computing Equations 2 and 3 and selecting the positive value of X, it is to be clearly understood that these are only shown by way of example and do not limit the spirit and scope of the invention as set forth in the following claims.

What is claimed is:

1. A device for decoding time-multiplexed cyclically permutated digital code to yield encoded information comprising means for detecting pulses with means coupled thereto for separating said pulses into different groups of alternate pulses, means coupled to said separating means for storing signals representative of the sum binary values of pulses in each of said groups with subtracting means coupled thereto and means coupled to said subtracting means for indicating an analog value representative of said encoded information.

2. A device for decoding time-multiplexed cyclically permutated serial digital code to yield encoded information comprising means for detecting pulses with means coupled thereto for separating alternate ones of said pulses into two groups of different pulses, capacitance means coupled to said separating means for storing signals representative of the binary value of each of said groups of pulses and means coupled thereto for comparing said stored signals to yield a signal representative of said encoded information.

3. A device for decoding time-multiplexed cyclically permutated serial binary words to yield information represented by said words comprising means for detecting pulses forming said words, means for detecting word interval, means coupled to said pulse detector for separating alternate pulses into two groups of different pulses, different capacitance means coupled to said separating means for storing signals representative of the binary value of each of said groups of pulses, each of said capacitance means having a predetermined time constant with signal comparing means coupled thereto, indicating means for indicating said information and gating means coupling said signal comparing means to said indicating means with means coupling said word interval detector to said gating means whereby at least one output of said comparing means is applied to said indicating means at the termination of said word interval.

4. A device for decoding time-multiplexed cyclically permutated binary words comprising pulse detecting means for detecting pulses forming said words, pulse separating means coupled to said detecting means for separating pulses into groups each group containing pulses representative of numbers of a given sign, different digital to analog converting means coupled to each of said separating means and responsive to a different one of said groups of pulses with a plurality of comparing means coupled thereto for detecting differences between analog representations of said numbers and means coupled to said comparing means for selecting and indicating at least one of said differences.

5. A device for decoding time-multiplexed cyclically permutated binary code comprising means for detecting pulses representing said code, pulse separating means coupled to said detecting means for separating said pulses into two groups representing binary values of opposite sign, different storage means coupled to each of said separating means with comparing means coupled to said storage means for detecting the difference between the outputs therefrom and means coupled to said comparing means for selecting and indicating at least one of said differences.

6. A decoding device for converting a time multiplexed cyclically permutated serial binary word into an equivalent analog signal comprising means for detecting pulses forming said word, means coupled to said detecting means for producing first and second groups of pulses, the intervals between pulses of each group being the same, digital to analog converting means coupled to said pulse producing means for converting said first and second groups of pulses into first and second analog signals and comparing means coupled to said converting means producing at least one signal representative of the difference between said first and second analog signals with signal selecting and indicating means coupled thereto for selecting and indicating at least one of said differences.

7. A device for decoding and indicating the information encoded by time-multiplexed cyclically permutated serial binary words as an analog signal comprising means for detecting pulses, means coupled to said detecting means for separating said pulses into different groups of alternate pulses, digital to analog converting means coupled to said detecting means with signal comparing means coupled thereto producing signals representative of differences between the binary values represented by said different groups of pulses and indicating means coupled to said comparing means for indicating at least one of said differences of a given predetermined sign.

References Cited in the file of this patent

UNITED STATES PATENTS

| | | |
|---|---|---|
| 2,866,177 | Steele | Dec. 23, 1958 |
| 2,885,613 | Myracle et al. | May 5, 1959 |
| 2,946,044 | Bolgiano et al. | July 19, 1960 |